Feb. 9, 1971  E. ZYCHAL  3,562,782
RESTRICTOR
Filed May 8, 1968
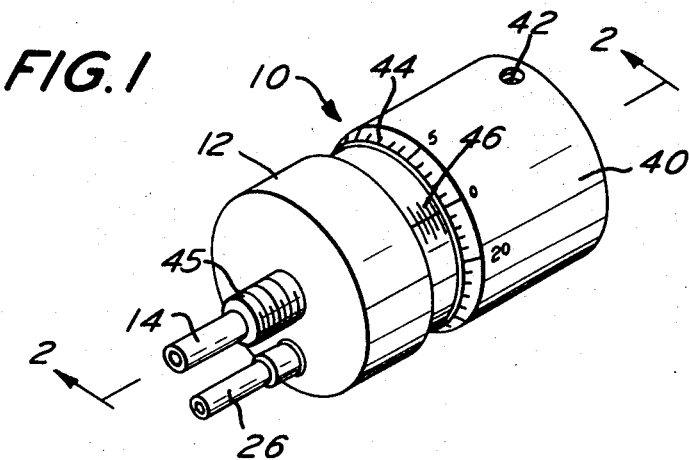
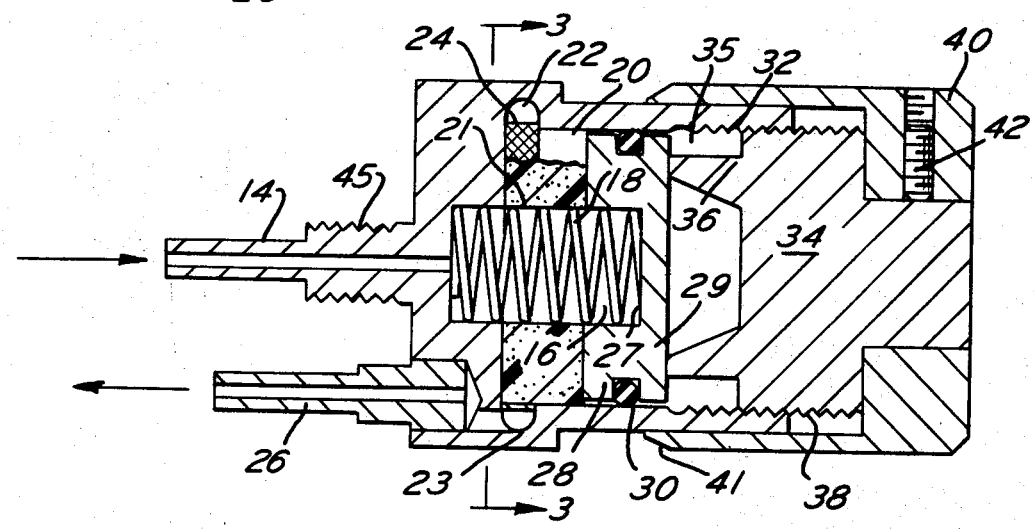
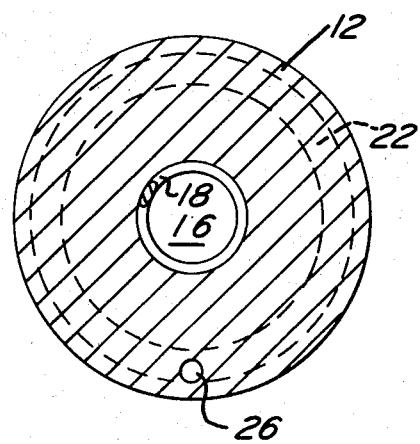
INVENTOR
EDWARD ZYCHAL
BY
Seidel & Gonda
ATTORNEYS.

United States Patent Office 3,562,782
Patented Feb. 9, 1971

3,562,782
RESTRICTOR
Edward Zychal, Cornwells Heights, Pa., assignor to Zyco Manufacturing, Inc., Cornwells Heights, Pa., a corporation of Pennsylvania
Filed May 8, 1968, Ser. No. 727,494
Int. Cl. F15d 1/00
U.S. Cl. 138—43                                    9 Claims

ABSTRACT OF THE DISCLOSURE

A restrictor having an inlet passage and an outlet passage at one end thereof. The inlet passage communicates with a centrally disposed chamber having a porous compressible element surrounding the chamber. A peripheral annular groove surrounds the porous element and communicates with the outlet passage. Liquid or gas is adapted to flow through the interstices in the porous element into the peripheral annular groove to the outlet passage. A micrometer adjustment means is provided at the other end of the restrictor for accurately controlling the size of the interstices of the compressible element and thereby controlling the flow through said element. A chart may be provided with each restrictor so that it is merely necessary to turn the micrometer adjustment means to a predetermined setting in order to obtain the desired flow of liquid or gas through the restrictor.

---

The present invention relates to a restrictor and more particularly to a restrictor having a micrometer adjustment means for accurately controlling flow through the restrictor.

Conventional variable flow restrictors have not been provided with micrometer adjustment means for controlling the flow through the restrictor. Hence, it has not been possible to accurately obtain a desired flow by merely setting a micrometer adjustment means of a variable flow restrictor. While it has been suggested to use porous materials in a restrictor, for instance, see U.S. Pat. 3,361,162, it has not been suggested that the characteristics of the porous element accurately measured and micrometer adjustment means of the restrictor be utilized.

Accordingly, it is an object of the present invention to provide a variable flow restrictor having micrometer adjustment means for obtaining desired flow.

It is another object of the present invention to provide a restrictor which may be utilized in combination with a chart so that a desired flow may be obtained by merely rotating a micrometer means to a predetermined setting.

It is a further object of the present invention to provide a restrictor which is highly effective in use.

It is a still further object of the present invention to provide a restrictor having parallel inlet and outlet passages at one end and a micrometer flow adjustment means at the other end and a piston member adapted to cooperate with a compressible porous element to vary flow through the restrictor.

Other objects will appear hereinafter.

The above and other objects are accomplished by providing a restrictor having an inlet passage cooperating with a centrally disposed chamber. A porous compressible element having interstices therein surrounds the centrally disposed chamber. A piston is adapted to cooperate with the porous compressible element to vary the size of the interstices within the member. An annular peripheral chamber, in part, surrounds the compressible element. An outlet passage parallel to the inlet passage and connected at the same end of the restrictor communicates with the peripheral annular chamber.

A micrometer adjustment means is provided at the other end of the restrictor. A piston is moved in response to movement of the micrometer means to vary the size of the interstices of the compressible element. Charts may be supplied so that it is merely necessary to set the micrometer to a predetermined setting in order to obtain a desired rate of flow through the restrictor. In the preferred embodiment, the restrictor is adapted for small rates of flow and the total movement of the piston may be approximately 25 mils. The restrictor is not adapted for use as a shut-off valve and even when the element has been fully compressed there will be a slight flow therethrough. The micrometer will be finely calibrated to permit accurate predetermined rates of flow within the tight tolerances. Means may be provided for preventing extrusion of the compressible element in the peripheral groove or the centrally disposed chamber.

For the purpose of illustrating the invention there is shown in the drawing a form which is presently preferred; it being understood, however, that this invention is not limited to the precise arrangements and instrumentalities shown.

FIG. 1 is a perspective view of the restrictor of the present invention;

FIG. 2 is a section view taken along line 2—2 of FIG. 1; and

FIG. 3 is a section view taken along line 3—3 of FIG. 2.

Referring now to the drawings in detail wherein like numerals indicate like elements throughout the several views, there is shown in FIG. 1 a restrictor generally indicated by the reference numeral 10.

The restrictor has a body 12 having an inlet passage 14 secured thereto. The inlet passage 14 may be integral with or removably secured to the body 12. In the preferred embodiment, the body 12 will be made of a non-ferrous metal. The inlet passage 14 communicates with a central chamber 16. A compression spring 18 is provided in the chamber 16 for a reason to be explained hereinafter.

An inert ring-shaped compressible porous metering element 20 surrounds the central chamber 16. The element has an inner periphery 21 and an outer periphery 23. The metering element 20 has interstices therein which permit the flow of gas or liquid therethrough. The composition of the element 20 may b a foam polymeric material, open cell urethane foam, latex foam, polypropylene felt, neoprene foam, a combination of such materials, or any other suitable material. The exact material or materials utilized will depend upon the properties of the fluid or gas metered by the restrictor 10. The element 20 which is utilized should be wholly inert with respect to the liquid or gas flowing therethrough and should have interstices of uniform size therein.

An annular groove 22 surrounds the element 20 and the metered gas or fluid flows into the groove. In FIG. 2, the element 20 is shown in full flow position wherein a minimum of compression of the element has taken place. A foraminous retaining ring 24 may be provided within the annular groove 22 to prevent the extrusion of the element 20 into the groove. The ring 24 will not obstruct flow therethrough into the groove.

An outlet passage 26 communicates with the groove 22. The outlet passage may be formed integral with the body 12 or may be removably secured thereto.

A piston 28 is adapted to be reciprocated within the body 12 of the restrictor 10. The piston 28 has a groove 29 therein which receives a conventional O-ring. The O-ring 30 prevents the escape of any of the metered gas or fluid beyond the piston 28. The piston 28 has a reaction surface 27 directly exposed to inlet pressure. The piston 28 is adapted to vary the size of the interstices of the element 20 in order to effect the quantity of the flow therethrough. The O-ring 30 will be of a material which will also be inert to the gas or liquid being metered.

The body 12 is threaded at 32. The threads 32 will mate with threads 38 provided on a screw plunger 34. The screw plunger 34 is provided with an annular bearing surface 36 which bears against the piston 28. A lubricant may be provided in the space 35 in order to facilitate relative rotation between the annular bearing surface 36 and the piston element 28. The lubricant may be a light silicone oil.

A cap or thimble 40 also preferably made of non-ferrous metal is secured to the screw plunger 34. A conventional set screw or Allen screw 42 may be provided for securing the cap 40 to the plunger 34. The cap 40 may be provided with a skirt portion 41 which is mitered at an angle of approximately 30° with respect to the horizontal as seen in FIG. 2.

The skirt portion 41 is provided with fine calibrations 42 thereon. The body 12 will also be provided with calibrations 46 thereon which cooperate with the calibrations 44 on the cap 40. In one embodiment, the total linear movement of the cap may be approximately 100 mils. The cap 40 may be rotated to move the piston 28 to thereby compress the element 20. When this occurs, the spring 18 will be further compressed and will prevent the element 20 from extruding into the chamber 16. The compression spring 18 will insure positive movement of the piston 28 and facilitate expansion of the element 20 as the cap is rotated to back the piston 28 away from the element 20.

The inlet passage 14 may be provided with a threaded portion 45 which will facilitate surface mounting of the restrictor. The screw plunger 34 will be provided with approximately 40 threads per inch in order to facilitate incremental movement of the cap 40.

It is within the scope of the present invention to utilize a composite element 20, such as a sandwiched element comprised of a combination of urethane and latex foam. Further, the element may be in doughnut form wherein a dense inner core is coated with a less dense outer coating. In particular, a neoprene foam inner core may be provided with an urethane coating in manufacturing the element 20. This would permit early compression characteristics to be varied in relation to latter compression characteristics as the interstices of the outer layer of material are substantially closed.

It is readily apparent that the restrictor will be calibrated depending upon the particular type of material utilized. The rate of flow will be substantially the same, within a tight tolerance, for each particular micrometer setting when identical materials are utilized. Hence, charts may be prepared permitting the user of a restrictor to obtain a desired flow by merely rotating the cap to the predetermined micrometer setting. The charts will differ depending upon the material utilized for element 20.

In one specific example, the flow through the restrictor was accurately varied from approximately one-quarter of an ounce per hour to approximately seven ounces per hour. However, it is clear that the restrictor can be made larger or smaller depending upon the use to which the restrictor is put. The restrictor will also be rated for a predetermined pressure of fluid fed to the restrictor. In the specific example discussed above, a low pressure feed was utilized.

The greatest variation in the flow will occur when the element 20 is highly compressed. In this situation, slight movements of the cap 40 will result in substantial changes in the flow. It has been found that the greatest range of control is obtained by using a very dense element 20.

The present invention may be embodied in other specific forms without departing from the spirit or essential attributes thereof and, accordingly, reference should be made to the appended claims, rather than to the foregoing specification as indicating the scope of the invention.

I claim:

1. A restrictor comprising a hollow body having an inlet passage at one end thereof, a porous compressive ring-shaped element having interstices therein, said element being disposed within said body, said inlet passage communicating with the inner periphery of said element, said body having an annular groove adjacent the outer periphery of said element, said body having an outlet passage communicating with said groove whereby flow through said element is in a radial direction, micrometer adjustment means coupled to said body for varying the size of the interstices of said element by compressing a face of said element in an axial direction and thereby accurately controlling the quantity of radial flow through said element, said adjustment means including a piston having a reaction surface exposed to the inlet passage by way of the inner periphery of said element, and means adjacent the inner periphery of said element for preventing said element from extruding radially inwardly when compressed including a spring surrounded by said element and compressed by said piston when the element is compressed.

2. A restrictor comprising a hollow body having inlet and outlet passages, a porous compressive ring-shaped element having interstices therein, said element being sandwiched so as to have components of different densities, one of said passages communicating directly with the inner periphery of said element, said body having an annular groove surrounding and adjacent to the outer periphery of said element, said groove communicating with the other of said passages, flow between said passages being radial with respect to said element, adjustment means including a piston engaging one face of said element for compressing said element against said body for varying the size of the interstices of said element as the element is compressed in an axial direction to control the radial flow through said element, means for preventing said element from extruding into said groove, said piston having a portion of its surface exposed to the pressure within the inner periphery of said element, and means surrounded by said element and adjacent the inner periphery of said element for preventing said element from being extruded inwardly when compressed by said piston, and the transverse dimensions of said inner periphery of said element being at least as large as the corresponding transverse dimension of said one passage which communicates with the inner periphery of said element.

3. A restrictor in accordance with claim 2 wherein said means adjacent the inner periphery of said element and surrounded by said element in a spring extending between said piston and said body for compression by the piston when the element is compressed.

4. A restrictor in accordance with claim 1 wherein the transverse dimensions of said inner periphery of said element are at least as large as the corresponding transverse dimensions of said inlet passage which is coaxial with said element.

5. A restrictor as set forth in claim 1 wherein said micrometer adjustment means includes a cap element connected to a plunger, said plunger being threadedly coupled to said body, said piston being within said body between said element and said plunger, whereby rotation of said cap causes said plunger to move said piston to thereby compress said element to vary the size of the interstices in said element.

6. A restrictor in accordance with claim 1 wherein said micrometer adjustment means includes a cap member having a skirt portion thereon, said skirt portion surrounding said body and having calibrations thereon, calibrations on said body cooperating with the calibrations on said skirt portion to facilitate accurate flow control through said element.

7. A restrictor in accordance with claim 1 including a retainer in said annular groove preventing extrusion of said element into said groove upon compression of said element.

8. A restrictor in accordance with claim 1 wherein the inner periphery of said element surrounds the axis of said inlet passage, said outlet passage communicating with said body at said one end thereof and being parallel to said inlet passage.

9. A restrictor in accordance with claim 1 wherein said element is composed of a foam polymeric material.

References Cited

UNITED STATES PATENTS

| | | | |
|---|---|---|---|
| 2,225,996 | 12/1940 | Johnson | 138—46 |
| 2,236,084 | 3/1941 | Brown | 138—43 |
| 2,304,689 | 12/1942 | Hanson | 138—46X |
| 2,943,643 | 7/1960 | Pinter | 138—46 |
| 3,322,145 | 5/1967 | Prosser | 138—43X |
| 3,361,162 | 1/1968 | Prestridge | 138—43X |
| 3,168,111 | 2/1965 | Strauss | 137—625.3 |
| 3,390,702 | 7/1968 | Gilmont | 137—625.3X |

HERBERT F. ROSS, Primary Examiner

U.S. Cl. X.R.

138—46; 137—625.3